3,272,862
RECOVERY OF TETRACYCLINE ANTIBIOTICS FROM FERMENTATION BROTHS
Ezio Caputo and Enzo Zannini, Milan, Italy, assignors to Ankerfarm S.p.A., Milan, Italy, a corporation of Italy
No Drawing. Filed Dec. 9, 1963, Ser. No. 329,298
Claims priority, application Italy, Oct. 19, 1963, 21,463/63
11 Claims. (Cl. 260—559)

This invention is directed to the recovery of tetracycline antibiotics from fermentation broths. By "tetracycline antibiotics" is meant to include tetracycline, 7-chlortetracycline, and 5-oxytetracycline.

The tetracycline antibiotics are manufactured by microbiological fermentation. They are produced in culture media in the form of dilute, impure, aqueous solutions. They contain both organic and inorganic contaminants, which must be separated before the tetracycline antibiotic is in a form suitable for use as a therapeutic agent.

We have now found that these tetracycline antibiotics may be advantageously recovered from acid solutions obtained from fermentation broths, by precipitation, adding cupric ions and a surface active agent. The surface active agent should preferably be present in excess of a stoichiometric amount based upon the amount of tetracycline antibiotic which is present.

Any of the water soluble cupric salts may be utilized, as for example cupric acetate, cupric bromide, cupric chloride, cupric nitrate, cupric sulphate, etc. However, for reasons of economy and ease of handling, we prefer to use cupric sulphate.

The preferred surface active agents used to precipitate the tetracycline copper complex are anionic type surface active agents, namely those surface active agents in which the long chain part of the molecule when dissolved in water becomes the negative ion or anion. A large number of anionic surface active agents are commercially available and may be used in the process of the present invention. These include the sodium alkyl sulphates ($ROSO_3Na$) and the sodium alkyl benzene sulfonates ($RC_6H_4SO_3Na$) wherein R is a hydrocarbon chain containing from 8 to 18 carbon atoms. The nature of the anionic surface active agent is not critical, and any one of the large number of these materials may be used. Examples include sodium lauryl sulphate, the Igepons, the sodium salts of dodecyldiphenylether disulphonic acid, sodium lauryl sulfoacetate, sodium glyceryl monolaurate sulfate, dioctyl sodium sulfosuccinate, sodium beta oleylathanesulfonate, sodium taurate, etc. Proprietary anionic surface active agents include: Lowila of the Foster Milburn Co.; Nyton of the Solvay Process Co.; Santomerse of Monsanto Chemical Co.; Surf of Lever Bros. Co., and Lensex of Shell Chemical Co.

The precipitate is filtered from the fermentation broth and the tetracycline antibiotic recovered therefrom by dissolving the precipitate in an organic solvent which is substantially immiscible with water. Preferred examples of suitable organic solvents are alcohols containing from 4 to 8 carbon atoms which are substantially immiscible with water, such an n-butyl alcohol, 1-pentanol, 2-pentanol, 1-hexanol, 2-hexanol, 3-hexanol, 1-heptanol, 2-heptanol, 3-heptanol, 4-heptanol, 2-octanol, etc. In addition, other organic solvents which are immiscible with water can be used, such as liquid hydrocarbons like hexane, heptane, octane, cyclohexane, benzene, toluene, the xylenes, etc.

The cupric ions are removed from the copper tetracycline antibiotic complex by aqueous extraction with an aqueous chelating agent which has a greater propensity for the copper than does the tetracycline antibiotic, and which removes the cupric ions into an aqueous solution.

Examples of suitable aqueous chelating agents, which effect removal of the cupric ions include aqueous solutions of ethylene diamine tetraacetic acid, nitrilotriacetic acid, N,N,di(beta hydroxyethyl) glycine, sodium tripolyphosphate, and sodium hexametaphosphate.

The organic phase containing the tetracycline antibiotic may then be purified by conventional means. Suitable techniques include either of the following methods:

METHOD A

The organic phase containing the dissolved tetracycline antibiotic is concentrated under vacuum to a small volume. Then a water soluble alcohol, such as methanol, ethanol, or isopropanol is added to obtain a concentration of from 100,000 to 150,000 $\gamma$/ml. of the tetracycline antibiotic. By adding concentrated hydrochloric acid the antibiotic is produced in the form of a crystalline salt.

METHOD B

The organic phase is concentrated under vacuum and then treated with an organic base, such as oleyl amine, linoleyl amine, N,N, dibenzylethylenedimine, dibenzylamine, or quaternary ammonium salt, such as the Arquads, which are quaternary ammonium salts containing one or more alkyl groups having from 8 to 18 carbon atoms, and which are sold by Armour & Co., Chicago 6, Illinois. The nature of the organic base is not critical and a wide variety of these materials may be used.

The amines or quaternary salts form soluble compounds with the surface active materials present in the complex. The tetracycline can then be extracted from the solvent by an aqueous mineral acid solution such as dilute hydrochloric acid. This aqueous extract, which contains the antibiotics, may then be adjusted to a pH of from about 3 to about 7.3. After several hours, or when the deposition of the tetracycline antibiotic in the form of the free base is complete, the tetracycline antibiotic free base may be filtered from the solution.

The temperature at which the purification of the present invention is performed is generally not critical. Temperatures above about room temperature up to about 50° C., or to a temperature below that at which decomposition of the tetracycline antibiotic may occur, are to be preferred during the initial treatment of the fermentation broth. Thus, the fermentation broth should first be filtered free of mycelia, and then adjusted to an acid pH within the general range of 0.5 to 6.0. The use of a hot solution, up to 50° C., facilitates the filtration of mycelia and other sediment from the fermentation broth.

The concentration of the cupric salt is not critical, but the same should be present in an excess over that required to complex all of the tetracycline antibiotic which is present. Similarly, as above-indicated, the surface active agent used to precipitate the cupric tetracycline antibiotic complex should be present in excess of the stoichiometric amount.

The pH conditions under which the cupric ions are removed from the cupric tetracycline antibiotic complex vary depending upon the chelating agent which is used. Thus, the art has developed to the point where specific conditions are to be preferred, and are known to the art, in respect to each of the chelating agents which can be used to remove the cupric ions from the cupric tetracycline antibiotic complex. For example, when ethylene diamine tetraacetic acid (Versene) is used as a chelating agent, an acidic pH must be used.

In order to illustrate the process of the present invention, the following examples are set forth by way of illustration, and not by way of limitation:

Example 1

10 liters of culture broth, free from mycelia, is acidified to a pH of 1.5 by sulfuric acid. The 10 liters has a content of 33.5 grams of tetracycline hydrochloride.

The 10 liters is then adjusted to a pH of 0.5 with 25 weight percent sulfuric acid. 105 ml. of a 20 weight percent solution of $CuSO_4.5H_2O$ is added. After a few minutes, there is added, under agitation, 900 ml. of 5 weight percent sodium lauryl sulfate. The agitation is continued for 30 minutes. The thus-formed precipitate is separated from the exhausted broth and dissolved in 800 ml. of butyl alcohol. The exhausted broth assays at 304 $\gamma$/cc. (namely gamma per cc.).

To the butyl alcohol solution is added 250 ml. of the 10 weight percent solution of Versene, previously acidified to a pH of 2.1 with 37 weight percent hydrochloric acid. The two phases are agitated together for three hours. The organic phase is then separated from the aqueous phase. The aqueous phase is then re-extracted with 200 ml. of butyl alcohol, and the alcohol, after separation, is combined with the first extract.

The combined organic extracts are concentrated under vacuum to a volume of about 300 ml. The temperature during concentration, must not exceed 30° C., as otherwise some decomposition of the tetracycline will occur. To the concentrate is then added an amount of Arquad 16/50 corresponding to the sodium lauryl sulfate, which has been used, and the mixture is diluted with 300 ml. of normal hexane. Then the tetracycline is extracted from the organic phase with 0.1 normal sulfuric acid. After all of the tetracycline has been extracted from the organic phase, 5 grams of finely divided charcoal are added to the combined aqueous extracts. After agitating for one-half hour the solution is filtered, and 3.5 grams of Versene are added. The filtrate is adjusted to a pH of from 4 to 6 with 10 weight percent NaOH. The solution is then agitated for 12 hours. The crystals of crude tetracycline base are filtered, washed with water, and dried at 60° C. under vacuum. The obtained crude tetracycline base weighed 23 grams, and had an activity of 950 $\gamma$/mg.

*Example 2*

10 liters of culture broth, free from mycelia, is acidified to a pH of 1.5 by sulfuric acid. The 10 liters has a content of 33.5 grams of tetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under stirring, 900 ml. of 5 weight percent sodium laurylsulfate. The stirring is continued for 30 minutes. The thus-formed precipitate is separated from the exhausted broth and dissolved in 800 ml. of butyl alcohol. The exhausted broth assays at 102 $\gamma$/cc.

To the butyl alcohol solution is added 250 ml. of the 10 weight percent solution of Versene, previously acidified to a pH of 2.1 with 37 weight percent hydrochloric acid. The two phases are agitated together for three hours. The organic phase is then separated from the aqueous phase. The aqueous phase is then re-extracted with 200 ml. of butyl alcohol, and the alcohol, after separation, is combined with the first extract.

The combined organic extracts are concentrated under vacuum to a volume of about 300 ml. The temperature during concentration, must not exceed 30° C., as otherwise some decomposition of the tetracycline will occur. To the concentrate is then added an amount of Arquad 16/50 corresponding to the sodium laurylsulfate, which has been used, and the mixture is diluted with 300 ml. of normal hexane. Then the tetracycline is extracted from the organic phase with 0.1 normal sulfuric acid. After all of the tetracycline has been extracted from the organic phase, 5 grams of finely divided charcoal are added to the combined aqueous extracts. After agitating for one-half hour the solution is filtered, and 3.5 grams of Versene are added. The filtrate is adjusted to a pH of from 4 to 6 with 10 weight percent NaOH. The solution is then agitated for 12 hours. The crystals of crude tetracycline base are filtered, washed with water, and dried at 60° C. under vacuum. The obtained crude tetracycline base weighed 24.5 grams, and had an activity of 1027 $\gamma$/mg.

*Example 3*

10 liters of culture broth, free from mycelia, is acidified to a pH of 1.5 by sulfuric acid. The 10 liters has a content of 33.5 grams of tetracycline hydrochloride.

The 10 liters is then adjusted to a pH of 3 with 10 weight percent NaOH. 105 ml. of a 20 weight percent solution of $CuSO_4.5H_2O$ is added. After a few minutes, there is added, under agitation, 900 ml. of 5 weight percent sodium laurylsulfate. The agitation is continued for 30 minutes. The thus-formed precipitate is separated from the exhausted broth and dissolved in 800 ml. of butyl alcohol. The exhausted broth assays at 122 $\gamma$/cc.

To the butyl alcohol solution is added 250 ml. of the 10 weight percent solution of Versene, previously acidified to a pH of 2.1 with 37 weight percent hydrochloric acid. The two phases are agitated together for three hours. The organic phase is then separated from the aqueous phase. The aqueous phase is then re-extracted with 200 ml. of butyl alcohol, and the alcohol, after separation, is combined with the first extract.

The combined organic extracts are concentrated under vacuum to a volume of about 300 ml. The temperature during concentration, must not exceed 30° C., as otherwise some decomposition of the tetracycline will occur. To the concentrate is then added an amount of Arquad 16/50 corresponding to the sodium laurylsulfate, which has been used, and the mixture is diluted with 300 ml. of normal hexane. Then the tetracycline is extracted from the organic phase with 0.1 normal sulfuric acid. After all of the tetracycline has been extracted from the organic phase, 5 grams of finely divided charcoal are added to the combined aqueous extracts. After agitation for one-half hour the solution is filtered, and 3.5 grams of Versene are added. The filtrate is adjusted to a pH of from 4 to 6 with 10 weight percent NaOH. The solution is then agitated for 12 hours. The crystals of crude tetracycline base are filtered, washed with water, and dried at 60° C. under vacuum. The obtained crude tetracycline base weighed 24 grams, and had an activity of 1010 $\gamma$/mg.

*Example 4*

10 liters of culture broth, free from mycelia, is acidified to a pH of 1.5 by sulfuric acid. The 10 liters has a content of 33.5 grams of tetracycline hydrochloride The 10 liters is then adjusted to a pH of 2 with 10 weight percent NaOH. 105 ml. of a 20 weight percent solution of $CuSO_4.5H_2O$ is added. After a few minutes, there is added, under agitation, 1220 ml. of 5 weight percent sodium laurylsulfonate. The agitation is continued for 30 minutes. The thus-formed precipitate is separated from the exhausted broth and dissolved in 800 ml. of butyl alcohol. The exhausted broth assays at 170 $\gamma$/cc.

To the butyl alcohol solution is added 250 ml. of the 10 weight percent solution of Versene, previously acidified to a pH of 2.1 with 37 weight percent hydrochloric acid. The two phases are agitated together for three hours. The organic phase is then separated from the aqueous phase. The aqueous phase is then reextracted with 200 ml. of butyl alcohol, and the alcohol, after separation, is combined with the first extract.

The combined organic extracts are concentrated under vacuum to a volume of about 300 ml. The temperature during concentration, must not exceed 30° C., as otherwise some decomposition of the tetracycline will occur. To the concentrate is then added an amount of Arquad 16/50 corresponding to the sodium laurylsulfonate, which has been used, and the mixture is diluted with 300 ml. of normal hexane. Then the tetracycline is extracted from the organic phase with 0.1 normal sulfuric acid. After all the tetracycline has been extracted from the organic phase, 5 grams of finely divided charcoal are added to the combined aqueous extracts. After agitation for one-half hour the solution is filtered, and 3.5 grams of Versene are added. The filtrate is adjusted to a pH of from 4 to 6 with 10 weight percent NaOH. The solution is then agitated for 12 hours. The crystals of crude tetracycline base are filtered, washed with water, and dried at 60° C. under vacuum. The obtained crude tetracycline base weighed 23.2 grams, and had an activity of 980 γ/mg.

*Example 5*

10 liters of culture broth, free from mycelia, is acidified to a pH of 1.5 by sulfuric acid. The 10 liters has a content of 33.5 grams of tetracycline hydrochloride.

The 10 liters is then adjusted to a pH of 2 with 10 weight percent NaOH. 105 ml. of a 20 weight percent solution of $CuSO_4 \cdot 5H_2O$ is added. After a few minutes, there is added, under agitation, 900 ml. of 5 weight percent sodium laurylsulfate. The agitation is continued for 30 minutes. The thus-formed precipitate is separated from the exhausted broth and dissolved in 800 ml. of isoamyl alcohol. The exhausted broth assays at 102 γ/cc.

To the isoamyl alcohol solution is added 250 ml. of a 10 weight percent solution of Versene, previously acidified to a pH of 2.1 with 37 weight percent hydrochloric acid. The two phases are agitated for three hours. The organic phase is then separated from the aqueous phase. The aqueous phase is then reextracted with 200 ml. of isoamyl alcohol, and the alcohol, after separation, is combined with the first extract.

The combined organic extracts are concentrated under vacuum to a volume of about 300 ml. The temperature during concentration, must not exceed 30° C., as otherwise some decomposition of the tetracycline will occur. To the concentrate is then added an amount of Arquad 16/50 corresponding to the sodium laurylsulfate, which has been used, and the mixture is diluted with 300 ml. of normal hexane. Then the tetracycline is extracted from the organic phase with 0.1 normal sulfuric acid. After all the tetracycline has been extracted from the organic phase, 5 grams of finely divided charcoal are added to the combined aqueous extracts. After agitating for one-half hour the solution is filtered, and 3.5 grams of Versene are added. The filtrate is adjusted to a pH of from 4 to 6 with 10 weight percent NaOH. The solution is then agitated for 12 hours. The crystals of crude tetracycline base are filtered, washed with water, and dried at 60° C. under vacuum. The obtained crude tetracycline base weighed 25 grams, and had an activity of 988 γ/mg.

*Example 6*

10 liters of culture broth, free from mycelia, is acidified to a pH of 1.5 by sulfuric acid. The 10 liters has a content of 33.5 grams of tetracycline hydrochloride.

The 10 liters is then adjusted to a pH of 2 with 10 weight percent NaOH. 105 ml. of a 20 weight percent solution of $CuSO_4 \cdot 5H_2O$ is added. After a few minutes, there is added, under stirring, 900 ml. of 5 weight percent sodium laurylsulfate. The agitation is continued for 30 minutes. The thus-formed precipitate is separated from the exhausted broth and dissolved in 800 ml. of butyl alcohol. The exhausted broth assays at 102 γ/cc.

To the butyl alcohol solution is added 250 ml. of 8 weight percent nitrilotriacetic acid, previously acidified to a pH of 2.1 with 37 weight percent hydrochloric acid. The two phases are agitated for three hours. The organic phase is then separated from the aqueous phase. The aqueous phase is then reextracted with 200 ml. of butyl alcohol, and the alcohol, after separation, is combined with the first extract.

The combined organic extracts are concentrated under vacuum to a volume of about 300 ml. The temperature during concentration must not exceed 30° C., as otherwise some decomposition of the tetracycline will occur. To the concentrate is then added an amount of Arquad 16/50 corresponding to the sodium laurylsulfate, which has been used, and the mixture is diluted with 300 ml. of normal hexane. Then the tetracycline is extracted from the organic phase with 0.1 normal sulfuric acid. After all the tetracycline has been extracted from the organic phase, 5 grams of finely divided charcoal are added to the combined aqueous extracts. After agitating for one-half hour the solution is filtered, and 3.5 grams of 8 weight percent nitrilotriacetic acid are added. The filtrate is adjusted to a pH of from 4 to 6 with 10 weight percent NaOH. The solution is then agitated for 12 hours. The crystals of crude tetracycline base are filtered, washed with water, and dried at 60° C. under vacuum. The obtained crude tetracycline base weighed 27.5 grams, and had an activity of 890 γ/mg.

*Example 7*

10 liters of culture broth, free from mycelia, is acidified to a pH of 1.5 by sulfuric acid. The 10 liters has a content of 33.5 grams of tetracycline hydrochloride.

The 10 liters is then adjusted to a pH of 2 with 10 weight percent NaOH. 105 ml. of a 20 weight percent solution of $CuSO_4 \cdot 5H_2O$ is added. After a few minutes, there is added, under agitation, 900 ml. of 5 weight percent sodium laurylsulfate. The agitation is continued for 30 minutes. The thus-formed precipitate is separated from the exhausted broth and dissolved in 800 ml. of isoamyl alcohol.

To the isoamyl alcohol solution is added 250 ml. of 10 weight percent solution of Versene, previously acidified to a pH of 2.1 with 37 weight percent hydrochloric acid. The two phases are agitated for three hours. The organic phase is then separated from the aqueous phase. The aqueous phase is then reextracted with 200 ml. of isoamyl alcohol, and the alcohol, after separation, is combined with the first extract.

The combined organic extracts are concentrated under vacuum to a volume of about 400 ml. The temperature during concentration must not exceed 30° C., as otherwise some decomposition of the tetracycline will occur. To the concentrate is then added an amount of N-N-dibenzylethylendiamine corresponding to the sodium laurylsulfate, which has been used, and the mixture is diluted with 400 ml. of normal hexane. Then the tetracycline is extracted from the organic phase with 0.1 normal sulfuric acid. After all the tetracycline has been extracted from the organic phase, 5 grams of finely divided charcoal are added to the combined aqueous extracts. After agitating for one-half hour the solution is filtered, and 3.5 grams of Versene are added. The filtrate is adjusted to a pH of from 4 to 6 with 10 weight percent NaOH. The solution is the nagitated for 12 hours. The crystals of crude tetracycline base are filtered, washed with water, and dried at 60° C. under vacuum. The obtained crude tetracycline base weighed 22.6 grams, and had an activity of 965 γ/mg.

*Example 8*

10 liters of culture broth, free from mycelia, is acidified to a pH of 1.5 by sulfuric acid. The 10 liters has a content of 33.5 grams of tetracycline hydrochloride.

The 10 liters is then adjusted to a pH of 2 with 10 weight percent NaOH. 105 ml. of a 20 weight percent solution of $CuSO_4 \cdot 5H_2O$ is added. After a few minutes there is added, under agitation, 900 ml. of 5 weight percent sodium laurylsulfate. The agitation is continued for 30 minutes. The thus-formed precipitate is separated from the exhausted broth and dissolved in 800 ml. of butyl alcohol.

To the butyl alcohol solution is added 250 ml. of 10 weight percent solution of Versene, previously acidified to a pH of 2.1 with 37 weight percent hydrochloric acid. The two phases are agitated for three hours. The organic phase is then separated from the aqueous phase. The aqueous phase is then reextracted with 200 ml. of butyl alcohol, and the alcohol, after separation, is combined with the first extract.

The combined organic extracts are concentrated under vacuum to a volume of about 300 ml. The temperature during concentration must not exceed 30° C., as otherwise some decomposition of the tetracycline will occur. To the concentrate is then added an amount of oleylamine corresponding to the sodium laurylsulfate, which has been used, and the mixture is diluted with 300 ml. of normal hexane. Then the tetracycline is extracted from the organic phase with 0.1 normal sulfuric acid. After all the tetracycline has been extracted from the organic phase, 5 grams of finely divided charcoal are added to the combined aqueous extracts. After agitating for one-half hour the solution is filtered, and 3.5 grams of Versene are added. The filtrate is adjusted to a pH of from 4 to 6 with 10 weight percent NaOH. The solution is then agitated for 12 hours. The crystals of crude tetracycline base are filtered, washed with water, and dried at 60° C. under vacuum. The obtained crude tetracycline base weighed 24 grams, and had an activity of 990 γ/mg.

*Example 9*

10 liters of culture broth, free from mycelia, is acidified to a pH of 1.5 by sulfuric acid. The 10 liters has a content of 33.5 grams of tetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under agitation, 900 ml. of 5 weight percent sodium laurylsulfate. The agitation is continued for 30 minutes. The thus-formed precipitate is separated from the exhausted broth and dissolved in 800 ml. of butyl alcohol.

To the butyl alcohol solution is added 250 ml. of 10 weight percent solution of Versene, previously acidified to a pH of 2.1 with 37 weight percent hydrochloric acid. The two phases are agitated for three hours. The organic phase is then separated from the aqueous phase. The aqueous phase is then reextracted with 200 ml. of butyl alcohol, and the alcohol, after separation, is combined with the first extract. The two combined organic extracts are then washed with 200 ml. of an aqueous saturated solution of sodium chloride.

The combined organic extracts are concentrated under vacuum to obtain a thick syrup. The temperature during concentration must not exceed 30° C., as otherwise some decomposition of the tetracycline will occur. The concentrate is dissolved in 220 ml. of methyl alcohol and into the methanol solution is slowly poured, under cooling, 25 ml. of concentrated hydrochloric acid.

After standing in refrigerator for 12 hours, the formed crystals are filtered and washed with methylisobutylketone and ether. After drying under vacuum at 40° C. there are obtained 26 grams of crude tetracycline hydrochloride. This assays at 886 γ/mg.

*Example 10*

10 liters of culture broth, free from mycelia, is acidified to a pH of 1.5 by sulfuric acid. The 10 liters has a content of 33.5 grams of tetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under agitation, 900 ml. of 5 weight percent sodium laurlysulfate. The agitation is continued for 30 minutes. The thus-formed precipitate is separated from the exhausted broth and dissolved in 800 ml. of isoamyl alcohol.

To the isoamyl alcohol solution is added 250 ml. of 8 weight percent nitrilotriacetic acid, previously acidified to a pH of 2 with 37 weight percent hydrochloric acid. The two phases are agitated for three hours. The organic phase is then separated from the aqueous phase. The aqueous phase is then reextracted with 200 ml. of isoamyl alcohol, and the alcohol, after separation, is combined with the first extract. The two combined organic extracts are then washed with 200 ml. of an aqueous saturated solution of sodium chloride.

The combined organic extracts are concentrated under vacuum to obtain a thick syrup. The temperature during concentration must not exceed 30° C., as otherwise some decomposition of the tetracycline will occur. The concentrate is dissolved in 220 ml. of methyl alcohol and into the methanol solution is slowly poured, under cooling, 25 ml. of concentrated hydrochloric acid.

After being refrigerated for 12 hours precipitated crystals of crude tetracycline are filtered and washed with methylisobutylketone and ether. After drying under vacuum at 40° C. the crude tetracycline hydrochloride weighs 27.4 grams and assays at 875 γ/mg.

*Example 11*

10 liters of culture broth, free from mycelia, is acidified to a pH of 1.5 by sulfuric acid. The 10 liters has a content of 33.5 grams of tetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under agitation, 900 ml. of 5 weight percent sodium laurylsulfate. The agitation is continued for 30 minutes. The thus-formed precipitate is separated from the exhausted broth and dissolved in 800 ml. of butyl alcohol.

To the butyl alcohol solution is added 250 ml. of a 10 weight percent solution of Versene, previously acidified to a pH of 2.1 with 37 weight percent hydrochloric acid. The two phases are agitated for three hours. The organic phase is then separated from the aqueous phase. The aqueous phase is then reextracted with 200 ml. of butyl alcohol, and the alcohol, after separation, is combined with the first extract. The two combined organic extracts are then washed with 200 ml. of an aqueous saturated solution of sodium chloride.

The organic phase is then concentrated under vacuum to obtain a thick syrup. The temperature during concentration must not exceed 30° C., as otherwise some decomposition of the tetracycline will occur. The concentrate is dissolved in 220 ml. of ethyl alcohol and into the ethanol solution is slowly poured, under cooling, 25 ml. of concentrated hydrochloric acid.

After being refrigerated for 12 hours precipitated crystals of crude tetracycline are filtered and washed with methylisobutylketone and ether. After drying under vacuum at 40° C. there is obtained 25.4 grams of crude tetracycline hydrochloride which assays at 880 γ/mg.

*Example 12*

10 liters of culture broth, free from mycelia, is acidified to a pH of 1.5 by sulfuric acid. The 10 liters has a content of 31 grams of oxytetracycline hydrochloride.

The 10 liters is then adjusted to a pH of 0.5 with 25 weight percent sulfuric acid. 105 ml. of a 20 weight percent solution of $CuSO_4.5H_2O$ is added. After a few minutes, there is added, under agitation, 820 ml. of 5 weight percent sodium laurylsulfate. The agitation is continued for 30 minutes. The thus-formed precipitate is separated from the exhausted broth and dissolved in 500 ml. of butyl alcohol. The exhausted broth assays at 327 γ/cc.

To the butyl alcohol solution is added 250 ml. of 10 weight percent solution of Versene, previously acidified to a pH of 2.1 with 37 weight percent hydrochloric acid. The two phases are agitated for three hours. The organic phase is then separated from the aqueous phase. The aqueous phase is then reextracted with 200 ml. of butyl alcohol, and the alcohol, after separation, is combined with the first extract.

The combined organic extracts are concentrated under vacuum to a volume of about 300 ml. The temperature during concentration must not exceed 30° C., as otherwise some decomposition of oxytetracycline will occur. To the concentrate is then added an amount of Arquad 16/50 corresponding to the sodium laurylsulfate, which has been used, and the mixture is diluted with 300 ml. of normal hexane. The oxytetracycline is then extracted from the organic phase with 0.1 normal sulfuric acid. After all of the oxytetracycline has been extracted from the organic phase, 5 grams of finely divided charcoal are added to the combined aqueous extracts. After agitating for one-half hour the solution is filtered, and 4 grams of Versene are added. The filtrate is adjusted to a pH of from 6.8 to 7.0 with 10 weight percent NaOH. The solution is then agitated for 12 hours. The crystals of crude oxytetracycline base are filtered, washed with water, and dried at 60° C. under vacuum. The crude oxytetracycline base weighed 20.7 grams, and assayed at 880 $\gamma$/mg.

*Example 13*

10 liters of culture broth, free from mycelia, is acidified to a pH of 1.5 by sulfuric acid. The 10 liters has a content of 31 grams of oxytetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under agitation, 820 ml. of 5 weight percent sodium laurylsulfate. The agitation is continued for 30 minutes. The thus-formed precipitate is separated from the exhausted broth and dissolved in 500 ml. of butyl alcohol. The exhausted broth assays at 164 $\gamma$/cc.

To the butyl alcohol solution is added 250 ml. of 10 weight percent solution of Versene, previously acidified to a pH of 2.1 with 37 weight percent hydrochloric acid. The two phases are agitated for three hours. The organic phase is then separated from the aqueous phase. The aqueous phase is then reextracted with 200 ml. of butyl alcohol, and the alcohol, after separation, is combined with the first extract.

The combined organic extracts are concentrated under vacuum to a volume of about 300 ml. The temperature during concentration must not exceed 30° C., as otherwise some decomposition of the oxytetracycline will occur. To the concentrate is then added an amount of Arquad 16/50 corresponding to the sodium laurylsulfate which has been used, and the mixture is diluted with 300 ml. of normal hexane. The oxytetracycline is then extracted from the organic phase with 0.1 normal sulfuric acid. After all of the oxytetracycline has been extracted from the organic phase, 5 grams of finely divided charcoal are added to the combined aqueous extracts. After agitating for one-half hour the solution is filtered, and 4 grams of Versene are added. The filtrate is adjusted to a pH of 6.8 to 7.0 with 10 weight percent NaOH. After the solution is agitated for 12 hours, the crystals of crude oxytetracycline base are filtered, washed with water, and dried at 60° C. under vacuum. The crude oxytetracycline base weighed 22.7 grams and assayed at 960 $\gamma$/mg.

*Example 14*

10 liters of culture broth, free from mycelia, is acidified to a pH of 1.5 by sulfuric acid. The 10 liters has a content of 31 grams of oxytetracycline hydrochloride.

The 10 liters is then adjusted to a pH of 3 with 10 weight percent NaOH. 105 ml. of a 20 weight percent solution of $CuSO_4.5H_2O$ is added. After a few minutes, there is added, under agitation, 820 ml. of 5 weight percent sodium laurylsulfate. The agitation is continued for 30 minutes. The thus-formed precipitate is separated from the exhausted broth and dissolved in 500 ml. of butyl alcohol. The exhausted broth assays at 189 $\gamma$/cc.

To the butyl alcohol solution is added 250 ml. of 10 weight percent solution of Versene, previously acidified to a pH of 2.1 with 37 weight percent hydrochloric acid. The two phases are agitated for three hours. The organic phase is then separated from the aqueous phase. The aqueous phase is then reextracted with 200 ml. of butyl alcohol, and the alcohol, after separation, is combined with the first extract.

The combined organic extracts are concentrated under vacuum to a volume of about 300 ml. The temperature during concentration must not exceed 30° C., as otherwise some decomposition of the oxytetracycline will occur. To the concentrate is then added an amount of Arquad 16/50 corresponding to the sodium laurylsulfate which has been used, and the mixture is diluted with 300 ml. of normal hexane. The oxytetracycline is then extracted from the organic phase with 0.1 normal sulfuric acid. After all of the oxytetracycline has been extracted from the organic phase, 5 grams of finely divided charcoal are added to the combined aqueous extracts. After agitating for one-half hour the solution is filtered, and 4 grams of Versene are added. The filtrate is adjusted to a pH of 6.8 to 7.0 with 10 weight percent NaOH. After the solution is agitated for 12 hours, the crystals of crude oxytetracycline base are filtered, washed with water and dried at 60° C. under vacuum. The crude oxytetracycline base weighed 22.2 grams and assayed at 877 $\gamma$/mg.

*Example 15*

10 liters of culture broth, free from mycelia, is acidified to a pH of 1.5 by sulfuric acid. The 10 liters has a content of 31 grams of oxytetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under agitation, 1100 ml. of 5 weight percent sodium laurylsulfonate. The agitation is continued for 30 minutes. The thus-formed precipitate is separated from the exhausted broth and dissolved in 500 ml. of butyl alcohol. The exhausted broth assays at 193 $\gamma$/cc.

To the butyl alcohol is added 250 ml. of 10 weight percent solution of Versene, previously acidified to a pH of 2.1 with 37 weight percent hydrochloric acid. The two phases are agitated for three hours. The organic phase is separated from the aqueous phase. The aqueous phase is then reextracted with 200 ml. of butyl alcohol, and the alcohol, after separation, is combined with the first extract.

The combined organic extracts are concentrated under vacuum to a volume of about 300 ml. The temperature during concentration must not exceed 30° C., as otherwise some decomposition of the oxytetracycline will occur. To the concentrate is then added an amount of Arquad 16/50 corresponding to the sodium laurylsulfonate which has been used, and the mixture is diluted with 300 ml. of normal hexane. The oxytetracycline is then extracted from the organic phase with 0.1 normal sulfuric acid. After all of the oxytetracycline has been extracted from the organic phase, 5 grams of finely divided charcoal are added to the combined aqueous extracts. After agitating for one-half hour the solution is filtered, and 4 grams of Versene are added and the filtrate is adjusted to a pH of 6.8 to 7.0 with 10 weight percent NaOH. After the solution is agitated for 12 hours, the crystals of crude oxytetracycline base are filtered, washed with water and dried at 60° C. under vacuum. The crude oxytetracycline base weighed 21.2 and assayed at 912 $\gamma$/mg.

*Example 16*

10 liters of culture broth, free from mycelia, is acidified to a pH of 1.5 by sulfuric acid. The 10 liters has a content of 31 grams of oxytetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under agitation, 820 ml. of 5 weight percent sodium laurylsulfate. The agitation is continued for 30 minutes. The thus-formed precipitate is separated from the exhausted broth and dissolved in 500 ml. of isoamyl alcohol. The exhausted broth assays at 164 $\gamma$/cc.

To the isoamyl alcohol solution is added 250 ml. of a 10 weight percent solution of Versene, previously acidified to a pH of 2.1 with 37 weight percent hydrochloric acid. The two phases are agitated for three hours. The organic phase is separated from the aqueous phase. The aqueous phase is then reextracted with 200 ml. of isoamyl alcohol, and the alcohol, after separation, is combined with the first extract.

The combined organic extracts are concentrated under vacuum to a volume of about 300 ml. The temperature during concentration must not exceed 30° C., as otherwise some decomposition of the oxytetracycline will occur. To the concentrate is then added an amount of Arquad 16/50 corresponding to the sodium laurylsulfate which has been used, and the mixture is diluted with 300 ml. of normal hexane. The oxytetracycline is then extracted from the organic phase with 0.1 normal sulfuric acid. After all of the oxytetracycline has been extracted from the organic phase, 5 grams of finely divided charcoal are added to the combined aqueous extracts. After agitating for one-half hour the solution is filtered and 4 grams of Versene are added. The filtrate is adjusted to a pH of 6.8 to 7.0 with 10 weight percent NaOH. After the solution is agitated for 12 hours, the crystals of crude oxytetracycline base are filtered, washed with water and dried at 60° C. under vacuum. The crude oxytetracycline base weighed 23.1 and assayed at 930 γ/mg.

*Example 17*

10 liters of culture broth, free from mycelia, is acidified to a pH of 1.5 by sulfuric acid. The 10 liters has a content of 31 grams of oxytetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under agitation, 820 ml. of 5 weight percent sodium laurylsulfate. The agitation is continued for 30 minutes. The thus-formed precipitate is separated from the exhausted broth and dissolved in 500 ml. of butyl alcohol. The exhausted broth assayed at 164 γ/cc.

To the butyl alcohol solution is added 250 ml. of 8 weight percent nitrilotriacetic acid, previously acidified to a pH of 2.1 with 37 weight percent hydrochloric acid. The two phases are agitated for three hours. The organic phase is separated from the aqueous phase. The aqueous phase is then reextracted with 200 ml. of butyl alcohol, and the alcohol, after separation, is combined with the first extract.

The combined organic extracts are concentrated under vacuum to a volume of about 300 ml. The temperature during concentration must not exceed 30° C., as otherwise some decomposition of the oxytetracycline will occur. To the concentrate is then added an amount of Arquad 16/50 corresponding to the sodium laurylsulfate which has been used, and the mixture is diluted with 300 ml. of normal hexane. The oxytetracycline is then extracted from the organic phase with 0.1 normal sulfuric acid. After all of the oxytetracycline has been extracted from the organic phase, 5 grams of finely divided charcoal are added to the combined aqueous extracts. After agitating for one-half hour the solution is filtered and 4 grams of Versene are added. The filtrate is adjusted to a pH of 6.8 to 7.0 with 10 weight percent NaOH. After the solution is agitated for 12 hours, the crystals of crude oxytetracycline base are filtered, washed with water and dried at 60° C. under vacuum. The crude oxytetracycline base weighed 22.5 grams and assayed at 946 γ/mg.

*Example 18*

10 liters of culture broth, free from mycelia, is acidified to a pH of 1.5 by sulfuric acid. The 10 liters has a content of 31 grams of oxytetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under agitation, 820 ml. of 5 weight percent sodium laurylsulfate. The agitation is continued for 30 minutes. The thus-formed precipitate is separated from the exhausted broth and dissolved in 500 ml. of isoamyl alcohol.

To the isoamyl alcohol solution is added 250 ml. of a 10 weight percent solution of Versene, previously acidified to a pH of 2.1 with 37 weight percent hydrochloric acid. The two phases are agitated for three hours. The organic phase is separated from the aqueous phase. The aqueous phase is then reextracted with 150 ml. of isoamyl alcohol and the alcohol, after separation, is combined with the first extract.

The combined organic extracts are concentrated under vacuum to a volume of about 300 ml. The temperature during concentration must not exceed 30° C., as otherwise some decomposition of the oxytetracycline will occur. To the concentrate is then added an amount of N-N-dibenzylethylendiamine corresponding to the sodium laurylsulfate which has been used, and the mixture is diluted with 300 ml. of normal hexane. The oxytetracycline is then extracted from the organic phase with 0.1 normal sulfuric acid. After all of the oxytetracycline has been extracted from the organic phase, 5 grams of finely divided charcoal are added to the combined aqueous extracts. After agitating for one-half hour the solution is filtered and 4 grams of Versene are added. The filtrate is adjusted to a pH of 6.8 with 10 weight percent NaOH. After the solution is agitated for 12 hours, the crystals of crude oxytetracycline base are filtered, washed with water and dried at 60° C. under vacuum. The crude oxytetracycline base weighed 21 grams and assayed at 923 γ/mg.

*Example 19*

10 liters of culture broth, free from mycelia, is acidified to a pH of 1.5 by sulfuric acid. The 10 liters has a content of 31 grams of oxytetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under agitation, 820 ml. of 5 weight percent sodium laurylsulfate. The agitation is continued for 30 minutes. The thus-formed precipitate is separated from the exhausted broth and dissolved in 500 ml. of butyl alcohol.

To the butyl alcohol solution is added 250 ml. of a 10 weight percent solution of Versene, previously acidified to a pH of 2.1 with 37 weight percent hydrochloric acid. The two phases are agitated for three hours. The organic phase is separated from the aqueous phase. The aqueous phase is then reextracted with 200 ml. of butyl alcohol, and the alcohol, after separation, is combined with the first extract.

The combined organic extracts are concentrated under vacuum to a volume of about 300 ml. The temperature during concentration must not exceed 30° C., as otherwise some decomposition of the oxytetracycline will occur. To the concentrate is then added an amount of oleylamine corresponding to the sodium laurylsulfate which has been used, and the mixture is diluted with 300 ml. of normal hexane. The oxytetracycline is then extracted from the organic phase with 0.1 normal sulfuric acid. After all of the oxytetracycline has beene extracted from the organic phase, 5 grams of finely divided charcoal are added to the combined aqueous extracts. After agitating for one-half hour the solution is filtered and a 4 grams of Versene are added. The filtrate is adjusted to a pH of 6.8 to 7.0 with 10 weight percent NaOH. After the solution is agitated for 12 hours, the crystals of crude oxytetracycline base are filtered, washed with water and dried at 60° C. under vacuum. The crude oxytetracycline base weighed 24 grams and assayed at 902 γ/mg.

*Example 20*

10 liters of culture broth, free from mycelia, is acidified to a pH of 1.5 by sulfuric acid. The 10 liters has a content of 31 grams of oxytetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under agitation, 820 ml. of 5 weight percent sodium laurylsulfate. The agitation is continued for 30 minutes. The thus-formed precipitate is separated from the exhausted broth and dissolved in 500 ml. of butyl alcohol.

To the butyl alcohol solution is added 250 ml. of 10 weight percent solution of Versene, previously acidified to a pH of 2.1 with 37 weight percent hydrochloric acid. The two phases are agitated for 2 to 3 hours. To this is added an amount of sodium chloride sufficient to saturate the water in the mixture. The organic phase is separated from the aqueous phase. The aqueous phase is then reextracted with 200 ml. of butyl alcohol, and the alcohol, after separation, is combined with the first extract.

The combined organic extracts are washed with 200 ml. of an aqueous saturated solution of sodium chloride. The organic phase is concentrated under vacuum to obtain a thick syrup. The temperature during concentration must not exceed 30° C., as otherwise some decomposition of the oxytetracycline will occur. The concentrate is dissolved in 200 ml. of methyl alcohol, and into the methyl alcohol solution is slowly poured, under cooling, 25 ml. of concentrated hydrochloric acid. After being refrigerated for 12 hours the crystals are filtered and washed with methylisobutylketone and ether. After drying at 60° C. under vacuum, the obtained 5-oxytetracycline hydrochloride weighed 25 grams and assayed at 925 $\gamma$/mg.

*Example 21*

10 liters of culture broth, free from mycelia, is acidified to a pH of 1.5 by sulfuric acid. The 10 liters has a content of 31 grams of oxytetracycline hydrochloride.

The 10 liters is then adjusted to a pH of 2 with 10 weight percent NaOH. 105 ml. of a 20 weight percent solution of $CuSO_4.5H_2O$ is added. After a few minutes, there is added, under agitation, 820 ml. of 5 weight percent sodium laurylsulfate. The agitation is continued for 30 minutes. The thus-formed precipitate is separated from the exhausted broth by filtration and dissolved in 500 ml. isoamyl alcohol.

To the isoamyl alcohol solution is added 250 ml. of 8 weight percent nitrilotriacetic acid. The two phases are agitated for three hours. The organic phase is separated from the aqueous phase. The aqueous phase is reextracted with 200 ml. of iosamyl alcohol, and the alcohol, after separation, is combined with the first extract.

The two combined organic extracts are washed with 200 ml. of an aqueous saturated solution of sodium chloride. The organic phase is then concentrated under vacuum to obtain a thick syrup. The temperature during concentration must not exceed 30° C., as otherwise some decomposition of the oxytetracycline will occur. The concentrate is dissolved in 220 ml. of methyl alcohol and into the methyl alcohol solution is slowly poured, under cooling, 25 ml. of concentrated hydrochloric acid. After being refrigerated for 12 hours the formed crystals are filtered and washed with methylisobutylketone and ether. The crude oxytetracycline hydrochloride obtained weighed 25.8 grams and assayed at 918 $\gamma$/mg.

*Example 22*

10 liters of culture broth, free from mycelia, is acidified to a pH of 1.5 by sulfuric acid. The 10 liters has a content of 15 grams of 7-chlortetracycline hydrochloride.

The 10 liters is then adjusted to a pH of 0.5 with 25 weight percent sulfuric acid. To this is added 55 ml. of a 20 weight percent solution of $CuSO_4.5H_2O$. After a few minutes, there is added, under agiation, 410 ml. of a 5 weight percent sodium laurylsulfate. The agitation is continued for 30 minutes. The thus-formed precipitate is separated from the exhausted broth and dissolved in 250 ml. of butyl alcohol. The exhausted broth assays at 132 $\gamma$/cc.

To the butyl alcohol solution is added 125 ml. of 10 weight percent solution of Versene, previously acidified to a pH of 2.1 with sulfuric acid. The two phases are agitated for three hours. The organic phase is separated from the aqueous phase. The aqueous phase is reextracted wtih 100 ml. of butyl alcohol. After the two organic extracts are combined, the last traces of copper are removed by washing the organic phase with 50 ml. of an aqueous saturated solution of sodium sulfate.

The organic phase is concentrated under vacuum to small volume. The evaporation temperature must not exceed 30° C., as otherwise some decomposition of the 7-chlortetracycline will occur. The concentrate is diluted with 150 ml. of methyl alcohol and into the methyl alcohol solution is slowly poured, under cooling, 13 ml. of concentrated hydrochloric acid. After being refrigerated for several hours, the crystals of 7-chlortetracycline hydrochloride are filtered and washed with ether and dried at 40° C. under vacuum. The 7-chlortetracycline hydrochloride thus obtained weighed 11.7 grams and assayed at 927 $\gamma$/mg.

*Example 23*

10 liters of culture broth, free from mycelia, is acidified to a pH of 1.5 by sulfuric acid. The 10 liters has a content of 15 grams of 7-chlortetracycline hydrochloride.

The 10 liters is then adjusted to a pH of 2 with 25 weight percent NaOH. To this is added 55 ml. of a 20 weight percent solution of $CuSO_4.5H_2O$. After a few minutes, there is added, under agitation, 410 ml. of a 5 weight percent solution of sodium laurylsulfate. The agitation is continued for 30 minutes. The thus-formed precipitate is separated from the exhausted broth by filtration and dissolved in 250 ml. of butyl alcohol. The exhausted broth assays at 53 $\gamma$/cc.

To the butyl alcohol solution is added 125 ml. of 10 weight percent solution of Versene, previously acidified to a pH of 2.1 with sulfuric acid. The two phases are agitated for three hours. The organic phase is separated from the aqueous phase. The aqueous phase is reextracted with 100 ml. of butyl alcohol. After the two organic extracts are combined, the last traces of copper are removed by washing the organic phase with 50 ml. of an aqueous saturated solution of sodium sulfate.

The organic phase is concentrated under vacuum to small volume. The evaporation temperature must not exceed 30° C., as otherwise some decomposition of the 7-chlortetracycline hydrochloride will occur. The concentrate is diluted with 150 ml. of methyl alcohol and into the methyl alcohol solution is slowly poured, under cooling, 13 ml. of concentrated hydrochloric acid. After being refrigerated for several hours, the crystals of 7-chlortetracycline hydrochloride are filtered and washed with ether and dried at 40° C. under vacuum. The 7-chlortetracycline hydrochloride thus obtained weighed 12 grams and assayed at 940 $\gamma$/mg.

*Example 24*

10 liters of culture broth, free from mycelia, is acidified to a pH of 1.5 by sulfuric acid. The 10 liters has a content of 15 grams of 7-chlortetracycline hydrochloride.

The 10 liters is then adjusted to a pH of 3 with 10 weight percent NaOH. To this is added 55 ml. of a 20 weight percent solution of $CuSO_4.5H_2O$. After a few minutes, there is added, under agitation, 410 ml. of a 5 weight percent solution of sodium laurylsulfate. The agitation is continued for 30 minutes. The thus-formed precipitate is separated from the exhausted broth and dissolved in 250 ml. of butyl alcohol. The exhausted broth assays at 74 $\gamma$/cc.

To the butyl alcohol solution is added 125 ml. of a 10 weight percent solution of Versene, previously acidified to a pH of 2.1 with sulfuric acid. After agitation for three hours, the organic phase is separated from the aqueous phase. The aqueous phase is reextracted with 100 ml. of butyl alcohol. After the two organic extracts are combined, the last traces of copper are removed by washing the organic phase with 50 ml. of an aqueous saturated solution of sodium sulfate.

The organic phase is concentrated, under vacuum, to small volume. The evaporation temperature must not exceed 30° C., as otherwise some decomposition of the 7-chlortetracycline hydrochloride will occur. The concentrate is diluted with 150 ml. of methyl alcohol and into the methyl alcohol solution is slowly poured, under cooling, 13 ml. of concentrated hydrochloric acid. After being refrigerated for several hours, the crystals of 7-chlortetracycline hydrochloride are filtered and washed with ether and dried at 40° C. under vacuum. The 7-chlortetracycline hydrochloride thus obtained weighed 12.1 grams and assayed at 890 γ/mg.

*Example 25*

10 liters of culture broth, free from mycelia, is acidified to a pH of 1.5 by sulfuric acid. The 10 liters has a content of 15 grams of 7-chlortetracycline hydrochloride.

The 10 liters is then adjusted to a pH of 2 with 25 weight percent NaOH. To this is added 55 ml. of a 20 weight percent solution of $CuSO_4.5H_2O$. After a few minutes, there is added, under agitation, 560 ml. of 5 weight percent solution of sodium laurylsulfonate. The agitation is continued for 30 minutes. The thus-formed precipitate is separated from the exhausted broth by filtration and dissolved in 250 ml. of butyl alcohol. The exhausted broth assays at 68 γ/cc.

To the butyl alcohol solution is added 125 ml. of a 10 weight percent solution of Versene, previously acidified to a pH of 2.1 with sulfuric acid. After agitating for three hours, the organic phase is separated from the aqueous phase. The aqueous phase is reextracted with 100 ml. of butyl alcohol. After the two organic extracts are combined, the last traces of copper are removed by washing the organic phase with 50 ml. of an aqueous saturated solution of sodium sulfate.

The organic phase is concentrated, under vacuum, to a volume of about 75 ml. The evaporation temperature must not exceed 30° C., as otherwise some decomposition of the 7-chlortetracycline hydrochloride will occur. There is then added 25 ml. of an aqueous saturated solution of sodium chloride and 25 ml. of Cellosolve. Then under strong cooling the mixture is agitated. When the mixture is near 0° C., concentrated hydrochloric acid is added until a pH of 0.3. The agitation is further continued for 12 hours, always under strong cooling. Then the crystals of 7-chlortetracycline hydrochloride are filtered and washed with either and dried at 40° C. under vacuum. The 7-chlortetracycline hydrochloride thus obtained weighs 12.8 grams and assays at 872 γ/mg.

*Example 26*

10 liters of culture broth, free from mycelia, is acidified to a pH of 1.5 by sulfuric acid. The 10 liters has a content of 15 grams of 7-chlortetracycline hydrochloride.

The 10 liters is then adjusted to a pH of 2 with 25 weight percent NaOH. To this is added 55 ml. of a 20 weight percent solution of $CuSO_4.5H_2O$. After a few minutes, there is added, under agitation, 410 ml. of 5 weight percent solution of sodium lauryl sulfate. The agitation is continued for 30 minutes. The thus-formed precipitate is separated from the exhausted broth by filtration and dissolved in 250 ml. of isoamyl alcohol.

To the isoamyl alcohol solution is added 125 ml. of a 10 weight percent solution of Versene, previously acidified to a pH of 2.1 with sulfuric acid. After agitating for three hours, the organic phase is separated from the aqueous phase. The aqueous phase is reextracted with 100 ml. of isoamyl alcohol. After the two organic extracts are combined, the last traces of copper are removed by washing the organic phase with 50 ml. of an aqueous saturated solution of sodium sulfate.

The organic phase is concentrated, under vacuum, to small volume. The evaporation temperature must not exceed 30° C., as otherwise some decomposition of the 7-chlortetracycline hydrochloride will occur. The concentrate is then diluted with 150 ml. of methyl alcohol and into the methyl alcohol solution is slowly poured, under cooling, 13 ml. of concentrated hydrochloric acid. After being refrigerated for several hours, the crystals of 7-chlortetracycline hydrochloride are filtered and washed with ether and dried at 40° C. under vacuum. The 7-chlortetracycline hydrochloride thus obtained weighed 11.9 grams and assayed at 912 γ/mg.

*Example 27*

10 liters of culture broth, free from mycelia, is acidified to a pH of 1.5 by sulfuric acid. The 10 liters has a content of 15 grams of 7-chlortetracycline hydrochloride.

The 10 liters is then adjusted to a pH of 2 with 25 weight percent NaOH. To this is added 55 ml. of 20 weight percent solution of $CuSO_4.5H_2O$. After a few minutes, there is added, under agitation, 410 ml. of 5 weight percent solution of sodium laurylsulfate. The agitation is continued for 30 minutes. The thus-formed precipitate is separated from the exhausted broth by filtration and dissolved in 250 ml. of butyl alcohol.

To the butyl alcohol solution is added 125 ml. of 8 weight percent nitrilotriacetic acid, previously acidified to a pH of 2.1 with sulfuric acid. After agitating for three hours, the organic phase is separated from the aqueous phase. The aqueous phase is reextracted with 100 ml. of butyl alcohol. After the two organic extracts are combined, the last traces of copper are removed by washing the organic phase with 50 ml. of an aqueous saturated solution of sodium sulfate.

The organic phase is concentrated, under vacuum, to small volume. The evaporation temperature must not exceed 30° C., as otherwise some decomposition of the 7-chlortetracycline hydrochloride will occur. The concentrate is then diluted with 150 ml. of methyl alcohol and into the methyl alcohol solution is slowly poured, under cooling, 13 ml. of concentrated hydrochloric acid.

After being refrigerated for several hours, the crystals of 7-chlortetracycline hydrochloride are filtered and washed with ether and dried, under vacuum, at 40° C. The 7-chlortetracycline hydrochloride thus obtained weighed 12.1 grams and assayed at 930 γ/mg.

*Example 28*

10 liters of culture broth, free from mycelia, is acidified to a pH of 1.5 by sulfuric acid. The 10 liters has a content of 15 grams of 7-chlortetracycline hydrochloride.

The 10 liters is then adjusted to a pH of 2 with 25 weight percent NaOH. To this is added 55 ml. of 20 weight percent solution of $CuSO_4.5H_2O$. After a few minutes, there is added, under agitation, 410 ml. of a 5 weight percent solution of sodium laurylsulfate. The agitation is continued for 30 minutes. The thus formed precipitate is separated from the exhausted broth by filtration and dissolved in 250 ml. of butyl alcohol.

To the butyl alcohol solution is added 125 ml. of 10 weight percent solution of Versene, previously acidified to a pH of 2.1 with sulfuric acid. After agitating for three hours, the organic phase is separated from the aqueous phase. The aqueous phase is reextracted with 100 ml. of butyl alcohol. After the two organic extracts are combined, the last traces of copper are removed by washing the organic phase with 50 ml. of an aqueous saturated solution of sodium sulfate.

The organic phase is concentrated, under vacuum, to small volume. The evaporation temperature must not exceed 30° C., as otherwise some decomposition of the 7-chlortetracycline hydrochloride will occur. The concentrate is then diluted with 150 ml. of ethyl alcohol and into the ethyl alcohol solution is slowly poured, under cooling, 13 ml. of concentrated hydrochloric acid.

After being refrigerated for several hours, the crystals of 7-chlortetracycline hydrochloride are filtered and washed with ether and dried at 40° C. under vacuum. The 7-chlortetracycline hydrochloride thus obtained weighed 12 grams and assayed at 930 γ/mg.

*Example 29*

10 liters of culture broth, free from mycelia, is acidified to a pH 1.5 by of sulfuric acid. The 10 liters has a content of 15 grams of 7-chlortetracycline hydrochloride.

The 10 liters is then adjusted to a pH of 2 with 25 weight percent NaOH. To this is added 55 ml. of 20 weight percent solutions of $CuSO_4 \cdot 5H_2O$. After a few minutes, there is added, under agitation, 410 ml. of 5 weight percent solution of sodium laurylsulfate. The agitation is continued for 30 minutes. The thus-formed precipitate is separated from the exhausted broth by filtration and dissolved in 250 ml. of butyl alcohol.

To the butyl alcohol solution is added 125 ml. of a 10 weight percent solution of Versene, previously acidified to a pH of 2.1 with sulfuric acid. After agitating for three hours, the organic phase is separated from the aqueous phase. The aqueous phase is reextracted with 100 ml. of butanol. After the two organic extracts are combined, they are concentrated, under vacuum, to a volume of about 150 ml. The concentration temperature must not exceed 30° C., as otherwise some decomposition of the 7-chlortetracycline hydrochloride will occur.

To the concentrate is then added an amount of Arquad 16/50 corresponding to the sodium laurylsulfate, which has been used, and the mixture is diluted with 150 ml. of normal hexane. Then the 7-chlortetracycline is extracted from the organic phase with 0.1 normal sulfuric acid. After the organic phase has been exhausted, 5 grams of finely divided charcoal are added to the combined aqueous extracts. The solution is agitated for 30 minutes, it is filtered, 2 grams of Versene are added and the filtrate is adjusted to pH 7 with 10% NaOH. After agitation for 12 hours the crystals of 7-chlortetracycline base are filtered and washed with water and dried at 60° C. under vacuum. The crude 7-chlortetracycline base thus obtained weighed 10.1 grams and assayed at 980 γ/mg.

*Example 30*

10 liters of culture broth, free from mycelia, is acidified to a pH of 1.5 by sulfuric acid. The 10 liters has a content of 15 grams of 7-chlortetracycline hydrochloride.

The 10 liters is then adjusted to a pH of 2 with 25 weight percent NaOH. To this is added 55 ml. of a 20 weight percent solution of $CuSO_4 \cdot 5H_2O$. After a few minutes, there is added, under agitation, 410 ml. of 5 weight percent sodium laurylsulfate. The agitation is then continued for 30 minutes. The thus-formed precipitate is separated from the exhausted broth by filtration and dissolved in 250 ml. of butyl alcohol. To the butyl alcohol solution is added 125 ml. of a 10 weight percent solution of Versene, previously acidified to a pH of 2.1 with sulfuric acid.

After agitating for three hours, the organic phase is separated from the aqueous phase. The aqueous phase is reextracted with 100 ml. of butyl alcohol. The combined organic extracts are concentrated, under vacuum, to a volume of about 150 ml. The concentration temperature must not exceed 30° C., as otherwise some decomposition of the 7-chlortetracycline hydrochloride will occur.

To the concentrate is then added an amount of oleylamine corresponding to the sodium laurylsulfate, which has been used, and the mixture is then diluted with 150 ml. of normal hexane. Then the 7-chlortetracycline is extracted from the organic phase with 0.1 normal sulfuric acid. After the organic phase has been exhausted, 5 grams of finely divided charcoal are added to the combined aqueous extracts. After agitation for one-half hour, the solution is filtered, 2 grams of Versene are added and the filtrate is adjusted to a pH of 7 with 10 weight percent NaOH. After agitating for 12 hours, the crystals of 7-chlortetracycline base are filtered and washed with water, and dried at 60° C. under vacuum. The crude 7-chlortetracycline base thus obtained weighed 10.3 grams and assayed at 967 γ/mg.

*Example 31*

10 liters of culture broth, free from mycelia, is acidified to a pH of 1.5 by sulfuric acid. The 10 liters has a content of 15 grams of 7-chlortetracycline hydrochloride.

The 10 liters is then adjusted to a pH of 2 with 25 weight percent NaOH. To this is added 55 ml. of a 20 weight percent solution of $CuSO_4 \cdot 5H_2O$. After a few minutes, there is added, under agitation, 410 ml. of 5 weight percent sodium laurylsulfate. The agitation is continued for 30 minutes. The thus-formed precipitate is separated from the exhausted broth by filtration and dissolved in 250 ml. of butyl alcohol.

To the butyl alcohol solution is added 125 ml. of a 10 weight percent solution of Versene, previously acidified to a pH of 2.1 with sulfuric acid. After agitating for 3 hours, the organic phase is separated from the aqueous phase. The aqueous phase is reextracted with 500 ml. of butanol. The combined organic extracts are concentrated, under vacuum, to a volume of about 150 ml. The concentration temperature must not exceed 30° C., as otherwise some decomposition of the 7-chlortetracycline hydrochloride will occur.

To the concentrate is added an amount of alkyl $(C_{12}C_{14})$-dibenzylammonium chloride, corresponding to the sodium laurylsulfate which has been used, and the mixture is then diluted with 150 ml. of normal hexane. Then the 7-chlortetracycline is extracted from the organic phase with 0.1 normal sulfuric acid. After the organic phase has been exhausted, 5 grams of finely divided charcoal are added to the combined aqueous extracts. After agitation for one-half hour, the solution is filtered, 2 grams of Versene are added, and the filtrate is adjusted to a pH of 7 with 10 weight percent NaOH. After agitating for 12 hours, the crystals of 7-chlortetracycline base are filtered and washed with water, and dried at 60° C. under vacuum. The crude 7-chlortetracycline base thus obtained weighed 10.3 grams and assayed at 980 γ/mg.

The recovery process of the present invention is useful with any of the microbiological methods for forming tetracycline antibiotics, and we have successfully recovered tetracycline antibiotics from a very wide variety of fermentation media, in which a very wide variety of microorganisms had been used.

The process of the present invention enables a tetracycline antibiotic of relatively high purity to be obtained at relatively low cost with relatively high yield.

The present invention may be embodied in other specific forms without departing from the spirit or essential attributes thereof and, accordingly, reference should be made to the appended claims, rather than to the foregoing specification as indicating the scope of the invention.

We claim:

1. A process for the recovery of a tetracycline antibiotic selected from the group consisting of tetracycline, 7-chlortetracycline, and 5-oxytetracycline from a fermentation broth which comprises filtering the broth free of mycelia, adjusting the pH of the broth to a pH of between 0.5 and 6.0, adding cupric ions and a surface active agent to precipitate a cupric complex of the tetracycline antiobiotic, separating by filtration said cupric complex of the tetracycline antibiotic, dissolving said precipitate of said cupric complex of the tetracycline antibiotic in an organic solvent which is immiscible with water, and removing the cupric ions from said dissolved cupric complex of the tetracycline antibiotic by aqueous extraction of said organic solution with an aqueous solution of a chelating agent which has a greater propensity for the cupric ions than does the tetracycline antibiotic and which removes the cupric ions into said aqueous solution, whereby a solution of the tetracycline antibiotic in said organic solvent is obtained.

2. A process in accordance with claim 1 in which the surface active agent is an anionic surface active agent.

3. A process in accordance with claim 2 in which both the cupric ions and the anionic surface active agent are present in an amount greater than the stoichiometric amounts therefor based on the tetracycline antibiotic.

4. A process in accordance with claim 3 in which the tetracycline antibiotic is tetracycline.

5. A process in accordance with claim 3 in which the tetracycline antibiotic is 7-chlortetracycline.

6. A process in accordance with claim 3 in which the tetracycline antibiotic is 5-oxytetracycline.

7. A process in accordance with claim 3 in which the aqueous solution of the chelating agent comprises an aqueous solution of ethylene diamine tetraacetic acid.

8. A process in accordance with claim 3 in which the aqueous solution of the chelating agent comprises an aqueous solution of nitrilotriacetic acid.

9. A process in accordance with claim 3 in which the aqueous solution of the chelating agent comprises an aqueous solution of N,N di(beta-hydroxyethyl) glycine.

10. A process in accordance with claim 3 in which the aqueous solution of the chelating agent comprises an aqueous solution of sodium tripolyphosphate.

11. A process in accordance with claim 3 in which the aqueous solution of the chelating agent comprises an aqueous solution of sodium hexametaphosphate.

References Cited by the Examiner

UNITED STATES PATENTS 3,050,558   8/1962   Smith et al. _____ 260—559

ALEX MAZEL, *Primary Examiner.*

JAMES W. ADAMS, JR., *Assistant Examiner.*